United States Patent [19]

Betz

[11] Patent Number: 4,702,892
[45] Date of Patent: Oct. 27, 1987

[54] HEAT RECUPERATIVE CATALYTIC OXIDATION DEVICE

[76] Inventor: Erwin C. Betz, 524 Mill Valley Rd., Palatine, Ill. 60067

[21] Appl. No.: 759,475

[22] Filed: Jul. 25, 1985

[51] Int. Cl.⁴ .................. B01D 50/00; B01D 53/36
[52] U.S. Cl. ........................ 422/171; 422/174;
    422/176; 422/177; 422/191; 422/199; 422/207;
    422/220; 422/235; 432/72; 34/79; 165/104.16
[58] Field of Search ............ 422/171, 174, 176, 177,
    422/180, 191, 193, 199, 207, 217, 220, 235;
    34/79; 432/72; 165/104.16

[56] References Cited

U.S. PATENT DOCUMENTS

| | | | |
|---|---|---|---|
| 2,743,529 | 5/1956 | Hayes | 432/72 |
| 3,251,656 | 5/1966 | Edwards | 422/176 |
| 3,428,434 | 2/1969 | Hurko | 422/171 |
| 3,604,824 | 9/1971 | Hardison | 432/72 |
| 3,607,133 | 9/1971 | Hirao et al. | 422/171 |
| 3,770,389 | 10/1973 | Kitzner et al. | 422/174 |
| 3,785,778 | 1/1974 | Burstein et al. | 422/171 |
| 3,929,420 | 12/1975 | Wood | 422/171 |
| 4,008,050 | 2/1977 | Betz | 422/195 |
| 4,135,885 | 1/1979 | Wormser et al. | 422/173 |
| 4,504,220 | 3/1985 | Sunakawa et al. | 432/72 |
| 4,562,795 | 1/1986 | Kraus | 432/72 |
| 4,628,689 | 12/1986 | Jourdan | 422/177 |

FOREIGN PATENT DOCUMENTS 24041  3/1981  Japan ..................... 422/174

Primary Examiner—David L. Lacey
Attorney, Agent, or Firm—Willian Brinks Olds Hofer Gilson & Lione Ltd.

[57] ABSTRACT

An oxidation assembly catalytically oxidizes organic hydrocarbon gases and recovers the heat held by the heated oxidized exhaust generated by such oxidation. The assembly includes a preheater and a catalytic recuperative heat generator which contains a suitable oxidation catalyst. An outside air inlet provides communication between the outside air and the heat generator. The assembly also includes a fan having a first and second outlet for moving the heated oxidized exhaust, and an outside air preheat exchanger. The first outlet of the fan and a recirculation duct communicate to form a loop for storing the heated oxidized exhaust for later use, and the second outlet of the fan and the inlet of the catalytic preheater communicate to form a loop for returning the oxidized exhaust to the preheater. Although the assembly may be designed with a fixed pre-adjusted gas flow control device, in the preferred embodiment, variable flow control devices are provided at various positions within the apparatus.

19 Claims, 4 Drawing Figures

HEAT RECUPERATIVE CATALYTIC OXIDATION DEVICE

BACKGROUND OF THE INVENTION

The invention relates generally to catalytic oxidation devices and more specifically to catalytic oxidation systems for use on gas flows containing hydrocarbon vapors which recover the energy released during the oxidation reaction.

Under modern pollution control regulations, most waste gas streams containing quantities of hydrocarbons must be treated to convert them to oxidation products such as water and carbon dioxide. For example, many chemical processes produce by-product gas streams containing low percentages of hydrocarbons. In spite of their low concentrations, in many localities they cannot be legally vented to the atmosphere.

One method frequently used to treat such waste gas streams is to pass them through a catalyst bed containing a catalytically active metal such as platinum, palladium, or the like. Such oxidation reactions are exothermic, and produce effluent streams which can reach very high temperatures. Exhausting such gas streams to the atmosphere is not only wasteful and thus contrary to current energy conservation practices but also may harm exhaust stacks and the catalytic oxidation equipment itself.

SUMMARY OF THE INVENTION

A catalytic heat generator according to the present invention is typically utilized in association with a heat treatment oven, such as a wire enameling oven or other equipment which requires a heat source, and which exhausts hydrocarbon vapors. The catalytic heat generator includes a catalytic preheater having an inlet, an outlet, and a catalytically active grid therebetween. Means are provided for heating the grid in order to raise the temperature of the gas stream to a level high enough to initiate catalysis. Downstream of the preheater is a catalytic recuperative generator having an inlet communicating with the outlet of said catalytic preheater, a catalyst, and an outlet. Outside air inlet means provide communication between the outside air, or ambient, and the generator. The heat generator also includes gas moving means, typically a fan, having an inlet and an outlet.

An outside air preheat exchanger is provided with first and second passageways in thermal communication with each other. The first passageway provides communication between the ambient and the inlet of the gas moving means, while the second passageway provides communication between the outlet of the catalytic generator and the ambient. Means are also provided for communication between the outlet of the catalytic generator and the inlet of the gas moving means. Finally, the invention includes means communicating between the outlet of the gas moving means and the inlet of the catalytic preheater.

Although the device may be designed with fixed or preadjusted gas flow control means, in the preferred embodiment, variable flow control means are provided at various positions within the apparatus, as hereinafter described.

The arrangement described above permits the recovery of the heat generated in the exothermic oxidation reactions which take place on the catalyst. Thus, rather than being lost to the atmosphere, it is returned to the industrial process to which the device is connected.

The invention, together with its objects and advantages, will be best understood by reference to the following description of the preferred embodiment and the accompanying drawings.

BRIEF DESCRIPTION OF THE DRAWINGS

FIG. 4 is a fragmentary plan view of the catalytic preheater shown in FIG. 2.

DESCRIPTION OF THE PREFERRED EMBODIMENT

Figure 1:
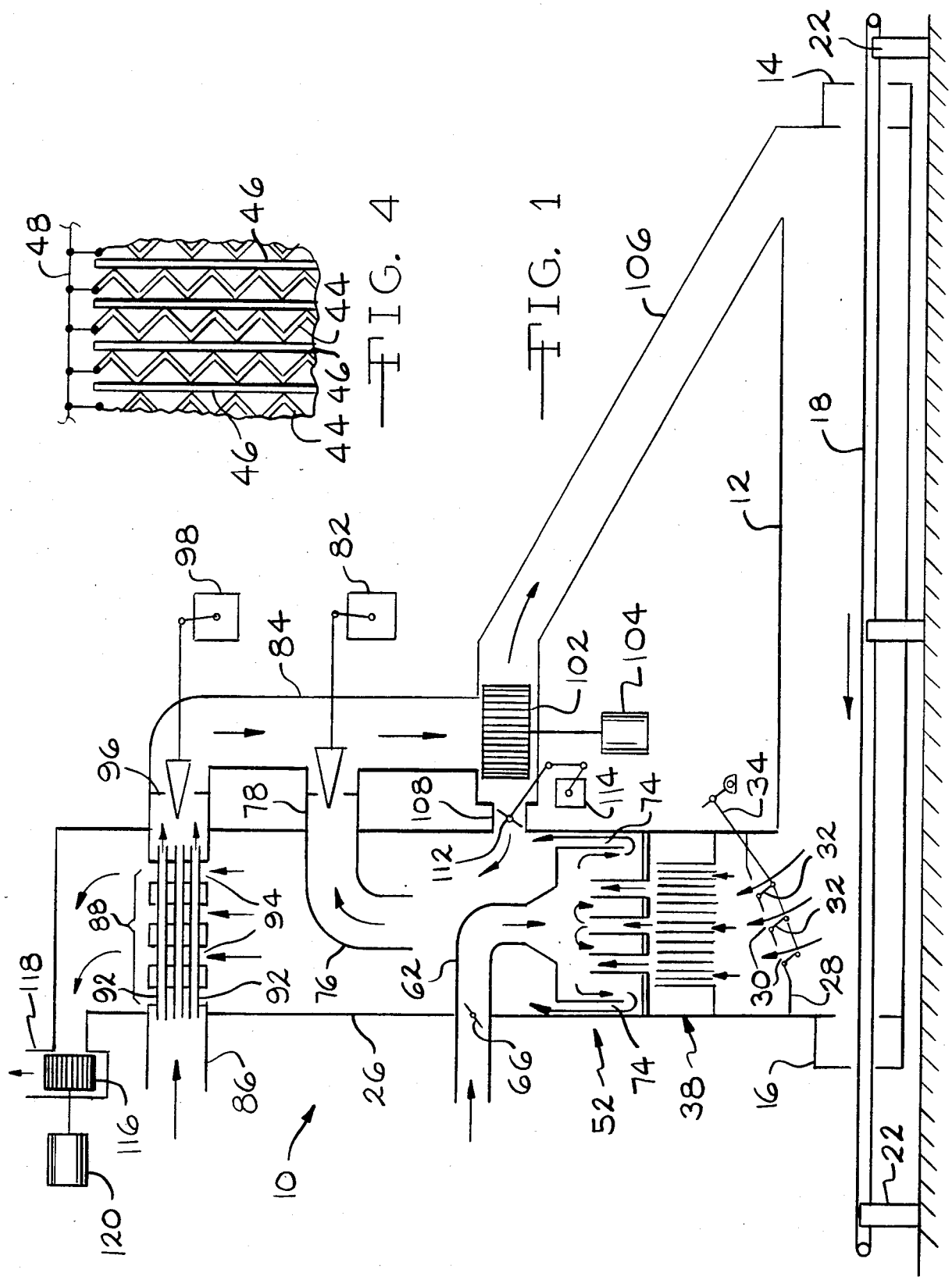
FIG. 1 is a diagrammatic view of a catalytic heat generator according to the instant invention in its presently preferred embodiment.

Referring now to FIG. 1, a catalytic heat generator according to the instant invention is diagrammatically illustrated and generally designated by the reference numeral 10. The catalytic heat generator 10 is typically utilized in association with process equipment such as a heat treating or drying oven 12, which does not form part of the present invention.

The oven 12 includes ingress and egress openings 14, 16, respectively, through which a conveyor belt 18 passes. The conveyor belt 18 is supported on stanchions 22 for circulation by a mechanical drive assembly (not illustrated). Items of manufacture are placed on the upper surface of the conveyor belt 18 adjacent the ingress opening 14, pass through the oven 12, where they are subjected to appropriate heat treatment, and are removed from the conveyor 18 at a location outside the oven 12 and adjacent the egress opening 16.

Figure 2:
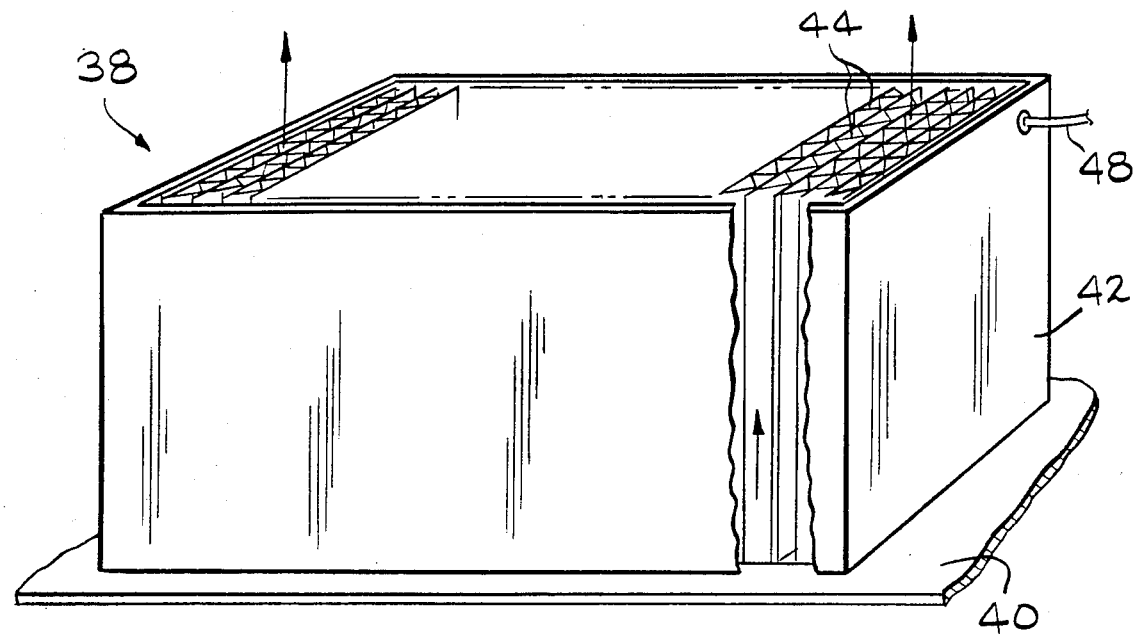
FIG. 2 is a perspective view with portions broken away of a preferred catalytic preheater, which forms a portion of the instant invention.

Referring now to FIGS. 1, 2 and 4, the catalytic heat generator 10 includes a large duct or stack 26 which is preferably positioned adjacent the egress opening 16 of the oven 12. At the base of the stack 26, above the oven 12, is a restriction such as a plate 28 having a plurality of perforations or apertures 30 disposed therein. The total area of the apertures 30 may be adjusted by a plurality of pivoted dampers 32 or similar means such as parallel relatively movable plates which facilitate adjustment of the size of the apertures 30 and thus the volume of gas flow therethrough. A suitable control linkage 34 preferably links the plurality of dampers 32 and simplifies and unifies adjustment of the dampers 32 as will be readily appreciated.

Disposed generally adjacent the plate 28 is a catalytic preheater assembly 38. The catalytic preheater assembly 38 is disposed on a mounting plate 40 which extends and is secured to the walls of the stack 26. The preheater assembly 38 is defined by a rectangular frame 42 which is secured to the mounting plate 40. The lower portion of the frame 42 forms an inlet, while the upper portion forms an outlet. The preheater assembly 38 comprises a plurality of metallic grids 44, such as metal screens.

In the preferred embodiment shown, the grids 44 are corrugated, and are separated by ceramic dividers 46. The grids 44 are catalytically active, and preferably have a catalytically active material deposited thereon. The ceramic dividers are preferably made of ceramic wool, although more rigid ceramic materials may be employed, as those skilled in the art will appreciate. The metallic grids 44 may also be separated from, in contact with, or enmeshed or woven into the ceramic wool. The ceramic dividers optionally may also have a catalytically active material deposited thereon.

The metallic grids 44 are preferably constructed of an electrical resistance alloy such as Ni-Cr-Fe or Nr-Al-Fe. Electrical terminations facilitate the application of electrical energy through leads 48, thereby heating the metallic grids 44. This heating helps to ensure the complete vaporization of any aerosols which might form upon mixing with outside (cool) air. If desired, the catalytic preheater assembly 38 may also include an adsorbent or absorbent disposed adjacent the metallic grids 44.

Figure 3:
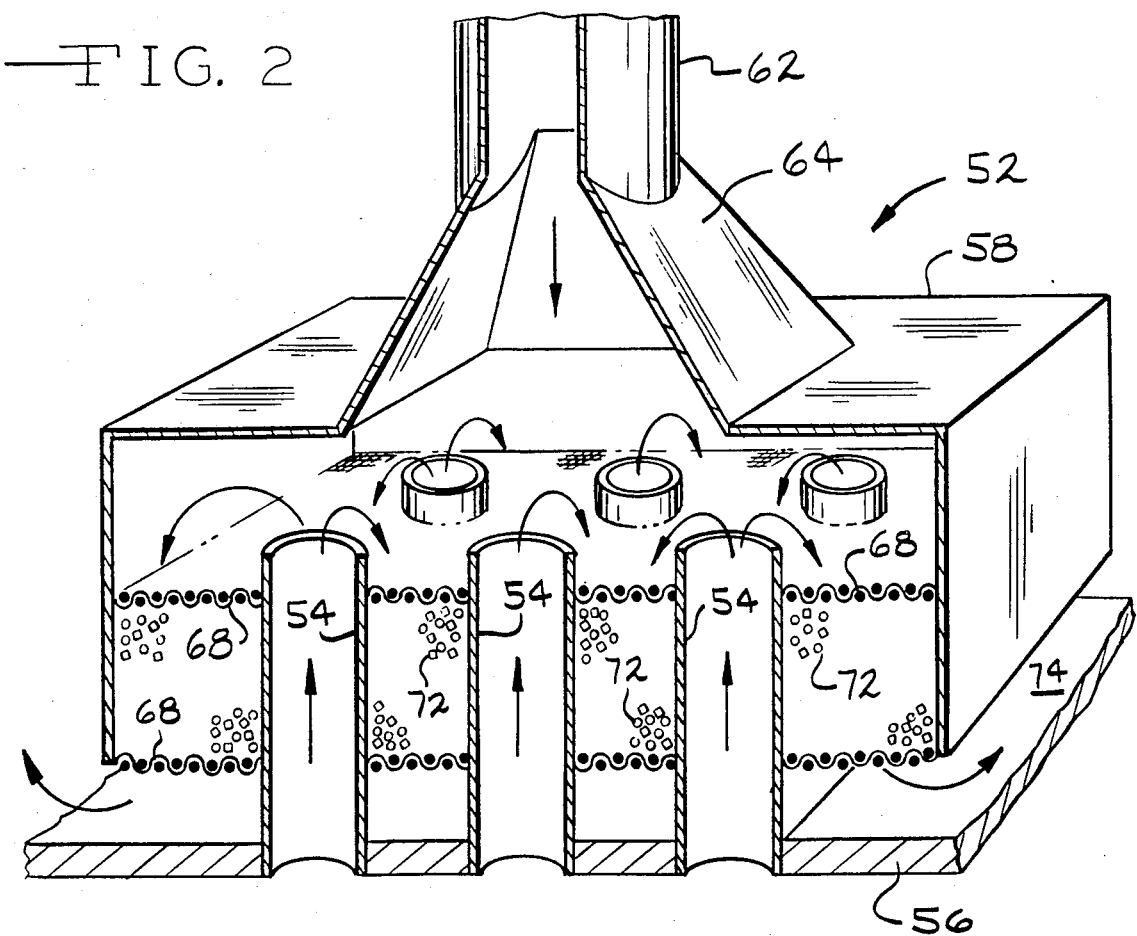
FIG. 3 is a sectional, perspective view of a catalytic recuperative generator which forms a portion of the instant invention.

Referring now to FIGS. 1 and 3, it will be appreciated that the effluent from the catalytic preheater assembly 38 flows directly into a catalytic recuperative generator assembly 52 disposed immediately adjacent the preheater assembly 38 in the stack 26. The catalytic recuperative generator assembly 52 includes a plurality of inlet tubes or conduits 54 which receive the gas effluent from the catalytic preheater assembly 38. The inlet conduits 54 are secured to a plate 56 which extends across the stack 26, and are generally received within a shroud or hood 58. In the preferred embodiment, a conduit or duct 62 provides for the intake of outside air through a throat section 64. The flow may be controlled by a damper 66 or other suitable volumetric flow control means.

Disposed within the hood 58 and preferably oriented generally parallel to the plate 56 are a pair of screens 68 or similar containment structures which position and retain an oxidizing catalyst 72. The oxidizing catalyst 72 preferably comprises a plurality of catalyst supports such as Lessing rings or crimped metal ribbons such as described in my issued U.S. Pat. Nos. 3,994,831 and 4,065,268, respectively, which are hereby incorporated by reference. The catalyst itself may be, for example, platinum, palladium or rhodium.

Hydrocarbons present in the gas stream are oxidized to carbon dioxide and water upon contact with the oxidizing catalyst 72. This oxidation reaction is exothermic, and the cool ambient air drawn into the catalytic recuperative generator assembly 52 through the duct 62 absorbs the heat generated by the oxidation reaction and thus cools the catalytic generator assembly 52 and prevents uncontrolled temperature rise therewithin. The outlet for the catalytic recuperative generator assembly 52 is formed along peripheral passageways 74 generally defined by the hood 58 and the stack 26.

A recirculation conduit or duct 76 is positioned within the stack 26 such that it receives a portion of the hot gases from the outlet of the recuperative generator assembly 52. The inlet of the recirculation duct 76 is positioned at a point which will be close to the maximum temperature achieved during operation of the catalytic heat generator 10.

A gas flow control valve 78 is positioned within the recirculation duct 76. The aperture defined by the control valve 78 is adjusted by a suitable adjustment means such as a control motor 82, thereby controlling the amount of gas recirculated into a supply duct 84, as will be readily appreciated. The supply duct 84 also receives a flow of ambient air from an ambient air supply duct 86.

The ambient air supply duct 86 also includes a transverse flow outside air heat exchanger 88, which is substantially conventional. The outside air heat exchanger 88 includes a first plurality of passageways 92 through which the ambient air from the air supply duct 86 passes and a second plurality of non-communicating passageways 94 through which the effluent from the catalytic generator 52 passes. The passageways 92 and 94, of course, thermally communicate, and the gases within the stack 26, being at an elevated temperature, transfer heat energy to the cooler ambient air passing through the ambient air supply duct 86. A control valve 96 adjusts the volume of air flowing into the supply duct 84, and is controlled by a suitable adjustment means such as a control motor 98.

Drawing air through the supply duct 84, that is, with its suction side communicating with the duct 84, is a fan or blower 102 powered by a suitable electric motor 104. The blower 102 is configured to provide a first output through a return duct 106, which supplies a mix of preheated and recirculated air to the oven 12. As may be appreciated from FIG. 1, this hot air eventually travels back to the apertures 32 and thence to the inlet of the preheater assembly 38.

A second output from the blower 102 is also provided through a duct 108, which returns to the stack 26 downstream of the catalytic recuperative generator assembly 52. The volume of gas flow through the duct 108 is controlled by a suitable control assembly such as a damper 112 and adjustment means such as a control motor 114.

Finally, the catalytic heat generator 10 and specifically the stack 26 includes an exhaust blower 116 which draws effluent through the stack 26 and out an exhaust duct 118. The blower 116 is powered by a suitable electric motor 120. The partial vacuum created by the exhaust blower 116 within the stack 26 aids in the ingestion of ambient air through the ducts 62 and 86, as will be readily appreciated.

With reference now to all of the drawing figures, especially FIG. 1, the operation of the catalytic heat generator 10 will be described. As noted, products of manufacture which are treated in the oven 12 volatize hydrocarbon vapors which enter the lower region of the stack 26 through the adjustable perforations or apertures 30 in the plate 28. The exhaust gases from the oven 12 then enter the catalytic preheater assembly 38. Here, the electrically heated catalyzed metal grids 44 insure that the gases are at the minimum takeoff temperature for the catalyst to operate, and also heat the influent stream adequately to insure the vaporization of any aerosols that might form when the exhaust gases are cooled upon mixing with cooler ambient air.

After such catalytic treatment, the gaseous mixture then enters the catalytic recuperative generator assembly 52. The hydrocarbons present in the gas flow are oxidized to carbon dioxide and water upon contact with the oxidizing catalyst 72. As noted, this reaction is exothermic and a compensating cool air stream is drawn into the upper portion of the catalytic recuperative generator 52 through a conduit 62 to cool the generator assembly 52 and prevent uncontrolled temperature rise therein.

A portion of the gases leaving the generator assembly 52 may be drawn by the blower 102 into a recirculation duct 76. The amount of such gases drawn into the duct 76 is controlled by the control valve 78. The remaining portion of the exhaust gases is drawn through the stack 26 and the passageways 94 of the heat exchanger 88 by the blower 116. The exhaust from the blower 116 is then channelled through the exhaust duct 118 to the atmosphere. Ambient air is also drawn into the system through the air supply duct 86 and the passageways 92 of the heat exchanger 88 and into the supply duct 88 by the blower 102. The control valve 96 adjusts the volume of ambient air so ingested. The preheated ambient air and recirculated gases are mixed in the supply duct 84 and returned by the blower 102 to the oven 12 through the duct 106. A portion of the mixture may also be returned to the exhaust stack through the duct 108. The proportion of air so returned is controlled by the damper 112 disposed in the duct 108.

The present invention not only provides a means of catalytically oxidizing various hydrocarbon constituents of exhaust gases, thereby rendering them safe and harmless to the atmosphere, but also exhibits significant energy and cost savings. It is recognized that catalytic oxidation within the catalytic recuperative generator assembly 52 requires minimum temperatures of 250° C. to 350° C. It is also known that the temperature rise attendant the exothermic catalytic oxidation reaction is proportional to the hydrocarbon concentration. Typically such temperature rise is between 200° C. and 300° C. Since the minimum oxidation temperature and temperature rise are additive, the discharge temperature from the recuperative generator assembly 52 can reach 450° C. to 650° C. In prior art systems this hot air was normally vented to the atmosphere, and large amounts of available energy were lost. In the system according to the present invention, a large portion of this energy is returned to the system, and specifically the oven.

As will be apparent to those skilled in the art, the various flow control valves permit the precise control of gas flow and temperature in various parts of the apparatus. For example, if temperatures become too high, the amount of recirculation through the system may be decreased by closing the gas flow control valve 78 and damper 112, while opening the control valve 96. The pivoted dampers 32 at the base of the stack 26 may also be adjusted to control overall flow through the device. At high temperatures, it may also be practical to shut off the electrical energy normally delivered to the metallic grids 44, thus providing further energy savings.

If desired, the introduction of auxiliary energy to the catalytic heat generator 10 may be also accomplished by injecting additional hydrocarbons into the duct 62 and thence into the catalytic recuperative generator assembly 52. The discharge from the recirculation blower 102 maintains a secondary energy loop which can be rapidly redirected to the oven 12 when the latter calls for more heat.

The foregoing disclosure is the best mode devised by the inventor for practicing this invention. It is apparent, however, that apparatus incorporating modifications and variations will be obvious to one skilled in the art. Inasmuch as the foregoing disclosure is intended to enable one skilled in the pertinent art to practice the instant invention, it should not be construed to be limited thereby, but should be construed to include such modifications and variations as fall within its true spirit and scope.

I claim:

1. A catalytic oxidation assembly comprising, in combination:
    a preheater;
    catalyst means having an inlet duct communicating with said preheater, a catalyst, and an outlet;
    a recirculation duct having an inlet communiating with said catalyst means outlet, and an outlet;
    gas moving means having an inlet, a first outlet, and a second outlet;
    means for providing communication between said gas moving means inlet and said recirculation duct outlet, and means for providing communication between said gas moving means first outlet and said recirculation duct inlet;
    an ambient air preheat exchanger having first and second passageways in thermal communication with each other, means for providing communication between the ambient and said gas moving means inlet, which includes said first passageway, and means for providing communication between said catalytic heat generator means outlet and the ambient which includes said second passageway;
    return means for providing communication between said gas moving means second outlet and said preheater; and
    exhaust means for providing communication between said catalyst means outlet and the ambient.

2. The catalytic oxidation assembly as defined in claim 1 wherein said recirculation duct further includes gas flow control means.

3. The catalytic oxidation assembly as defined in claim 1 further including gas flow control means in said gas moving means first outlet.

4. The catalytic oxidation assembly as defined in claim 1 wherein said catalyst means comprises:
    a hood receiving at least a portion of said catalyst means inlet duct;
    said catalyst being positioned in said hood and surrounding at least a portion of said catalyst means inlet duct, and forming a catalyst layer between said hood and said catalyst means inlet duct;
    an ambient air inlet duct for providing communication between the ambient and said hood.

5. The catalytic oxidation assembly as defined in claim 4 wherein said ambient air inlet duct further includes gas flow control means.

6. The catalytic oxidation assembly as defined in claim 1 wherein said means for providing communication between the ambient and said gas moving means inlet further includes gas flow control means.

7. The catalytic oxidation assembly as defined in claim 1 wherein said preheater comprises a catalytically active grid.

8. The catalytic oxidation assembly as defined in claim 1 wherein said preheater comprises a plurality of catalytically active metallic grids heated by electrical heating means and separated by a plurality of ceramic dividers interleaved with said grids.

9. The catalytic oxidation assembly as defined in claim 8 wherein said dividers are ceramic wool and wherein said metallic grids are enmeshed in said dividers.

10. A catalytic oxidation assembly comprising, in combination:
    a preheater;
    catalyst means having an inlet duct communicating with said preheater, a hood receiving at least a portion of said inlet duct, a catalyst positioned in said hood and surrounding at least a portion of said inlet duct and forming a catalyst layer between said hood and said inlet duct, and an outlet;

an ambient air inlet duct connected to said hood so as to provide communication between the ambient and said hood;

a recirculation duct having an inlet communicating with said catalyst means outlet, and an outlet;

gas moving means having an inlet, and an outlet;

means for providing communication between said gas moving means inlet and said recirculation duct outlet, and means for providing communication between said gas moving means outlet and said recirculation duct inlet; and an ambient air preheat exchanger having first and second passageways in thermal communication with each other, means for providing communication between the ambient and said gas moving means inlet which includes said first passageway, and means for providing communication between said catalytic heat generator means outlet and the ambient which includes said second passageway.

11. The catalytic oxidation assembly as defined in claim 10 further including gas flow control means in said gas moving means outlet.

12. The catalytic oxidation assembly as defined in claim 10 wherein said ambient air inlet duct further includes gas flow control means.

13. The catalytic oxidation assembly as defined in claim 10 wherein said means for providing communication between the ambient and said gas moving means inlet further includes gas flow control means.

14. The catalytic oxidation assembly as defined in claim 13 wherein said recirculation duct further includes gas flow control means.

15. The catalytic oxidation assembly as defined in claim 10 wherein said preheater comprises a catalytially active grid.

16. The catalytic oxidation assembly as defined in claim 10 wherein said preheater comprises a plurality of catalytically active metallic grids heated by electrical heating means and separated by a plurality of ceramic dividers interleaved with said grids.

17. The catalytic oxidation assembly as defined in claim 16 wherein said dividers are ceramic wool and wherein said metallic grids are enmeshed in said dividers.

18. A catalytic oxidation assembly comprising, in combination:

a preheater;

catalyst means having an inlet duct communicating with said preheater, a hood receiving at least a portion of said inlet duct, a catalyst positioned in said hood and surrounding at least a portion of said inlet duct and forming a catalyst layer between said hood and said inlet duct, and an outlet;

an ambient air inlet duct communicating between the ambient and said hood;

a recirculation duct having an inlet communicating with said catalyst means outlet, and an outlet;

gas moving means having an inlet, a first outlet, and a second outlet;

means for providing communication between said gas moving means inlet and said recirculation duct outlet, and means for providing communication between said gas moving means first outlet and said recirculation duct inlet;

return means communicating between said gas moving means second outlet and said preheater; and an ambient air preheat exchanger having first and second passageways in thermal communication with each other, means for providing communication between the ambient and said gas moving means inlet which includes said first passageway, and means for providing communication between said catalyst means outlet and the ambient which includes said second passageway.

19. A catalytic oxidation assembly comprising:

a stack;

a recuperative heat generator positioned in said stack comprising:

plate positioned in and extending across said stack;

an inlet duct passing through said plate;

a hood receiving at least a portion of said inlet duct;

a catalyst positioned in said hood and surrounding at least a portion of said inlet duct and forming a catalyst layer between said hood and said inlet duct;

an ambient inlet duct connected to said hood for providing communication between the ambient and said hood; and an outlet; and an ambient air preheat exchanger having first and second passageways in thermal communication with each other, means for providing communication between the ambient and said duct passing through said plate which includes said first passageway, and means for providing communication between said catalytic heat generator means outlet and the ambient which includes said second passageway.

* * * * *

UNITED STATES PATENT AND TRADEMARK OFFICE
CERTIFICATE OF CORRECTION

PATENT NO.   : 4,702,892
DATED        : October 27, 1987
INVENTOR(S)  : Erwin C. Betz It is certified that error appears in the above-identified patent and that said Letters Patent is hereby corrected as shown below:   Title Page:

On page 1, under the section entitled "References Cited U.S. PATENT DOCUMENTS", add --3,817,716  6/1975  Betz ..... 23/288--.

Claim 1, line 6, delete "communiating" and insert --communicating-- therefor;

Claim 15, line 2, delete "catalytially" and insert --catalytically-- therefor;

Claim 19, line 12, after "ambient" insert --air--.

Signed and Sealed this

Twentieth Day of December, 1988

Attest:

DONALD J. QUIGG

Attesting Officer        Commissioner of Patents and Trademarks